United States Patent
Martin

(10) Patent No.: US 7,128,865 B2
(45) Date of Patent: Oct. 31, 2006

(54) APPARATUS AND METHOD FOR TWO STAGE EJECTION OF A MOLDED PREFORM FROM A MOLD

(75) Inventor: Simon Roy Martin, Mississauga (CA)

(73) Assignee: Husky Injection MOlding Systems Ltd.(CA)

( * ) Notice: Subject to any disclaimer, the term of this patent is extended or adjusted under 35 U.S.C. 154(b) by 383 days.

(21) Appl. No.: 10/736,691

(22) Filed: Dec. 17, 2003

(65) Prior Publication Data

US 2005/0136150 A1 Jun. 23, 2005

(51) Int. Cl.
*B29C 45/44* (2006.01)

(52) U.S. Cl. ............... 264/318; 264/537; 264/336; 425/533; 425/556

(58) Field of Classification Search ............... 264/336, 264/537, 318, 334; 425/533, 556
See application file for complete search history.

(56) References Cited

U.S. PATENT DOCUMENTS

| | | |
|---|---|---|
| 3,269,617 A | 8/1966 | Goth |
| 4,025,022 A | 5/1977 | Theysohn et al. |
| 4,125,246 A | 11/1978 | von Holdt |
| 4,179,254 A | 12/1979 | Brown |
| 4,201,535 A | 5/1980 | Ninneman |
| 4,521,177 A | 6/1985 | Blank et al. |
| 4,570,897 A * | 2/1986 | Von Holdt ........... 425/DIG. 58 |
| 4,575,331 A | 3/1986 | Dundas et al. |
| 4,603,831 A | 8/1986 | Krishnakumar et al. |
| 4,615,667 A | 10/1986 | Roy |
| 4,632,357 A | 12/1986 | Von Holdt |
| 4,648,834 A | 3/1987 | Von Holdt |
| 5,137,442 A | 8/1992 | Starkey |
| 5,647,930 A | 7/1997 | Bright |
| 5,736,173 A | 4/1998 | Wright et al. |
| 5,762,970 A | 6/1998 | Takashima et al. |
| 5,833,912 A | 11/1998 | Schweigert et al. |
| 6,176,700 B1 | 1/2001 | Gellert |
| 6,220,850 B1 | 4/2001 | Catoen et al. |

(Continued)

FOREIGN PATENT DOCUMENTS

EP 0 089 047 A1 9/1983

(Continued)

OTHER PUBLICATIONS

Zygo Drawings (11 sheets).

(Continued)

*Primary Examiner*—Jill L. Heitbrink
(74) *Attorney, Agent, or Firm*—Katten Muchin Rosenman LLP

(57) ABSTRACT

Injection molding method and apparatus for ejecting a molded plastic preform from a mold. A first lifting structure and/or step is configured to have an inner surface with an area for sealing and aligning with a complementary surface on a core, and to have an upper surface with an area for sealing and aligning with a complementary surface on a second lifting structure, said upper surface of said first lifting structure being configured to lift a molded plastic preform from the injection mold in a lifting direction for a first period of time, the lower portion of the molded plastic preform lying in a plane substantially perpendicular to the lifting direction. A second lifting structure and/or step is configured to have an inner surface configured to lift an outer surface of the molded plastic preform from the injection mold in the lifting direction for a second period of time, the outer surface of the molded plastic preform including structure lying in a plane substantially parallel with the lifting direction.

Since the molded plastic preform is lifted by its end, the preform does not have to be solidified at its interior, thus allowing earlier removal of the preform from the mold, reducing cycle time.

23 Claims, 8 Drawing Sheets

U.S. PATENT DOCUMENTS

| | | |
|---|---|---|
| 6,413,075 B1 | 7/2002 | Koch et al. |
| 6,604,932 B1 | 8/2003 | Ciccone |
| 2004/0145082 A1 | 7/2004 | Miller et al. |

FOREIGN PATENT DOCUMENTS

| | | |
|---|---|---|
| FR | 2 488 547 | 2/1982 |

OTHER PUBLICATIONS

R. G. W. Pye, Injection Mould Design, 1983, pp. 104-107, Longman Scientific & Technical, copublished in the U.S. with John Wiley & Sons, in association with The Plastics and Rubber Institute.

* cited by examiner

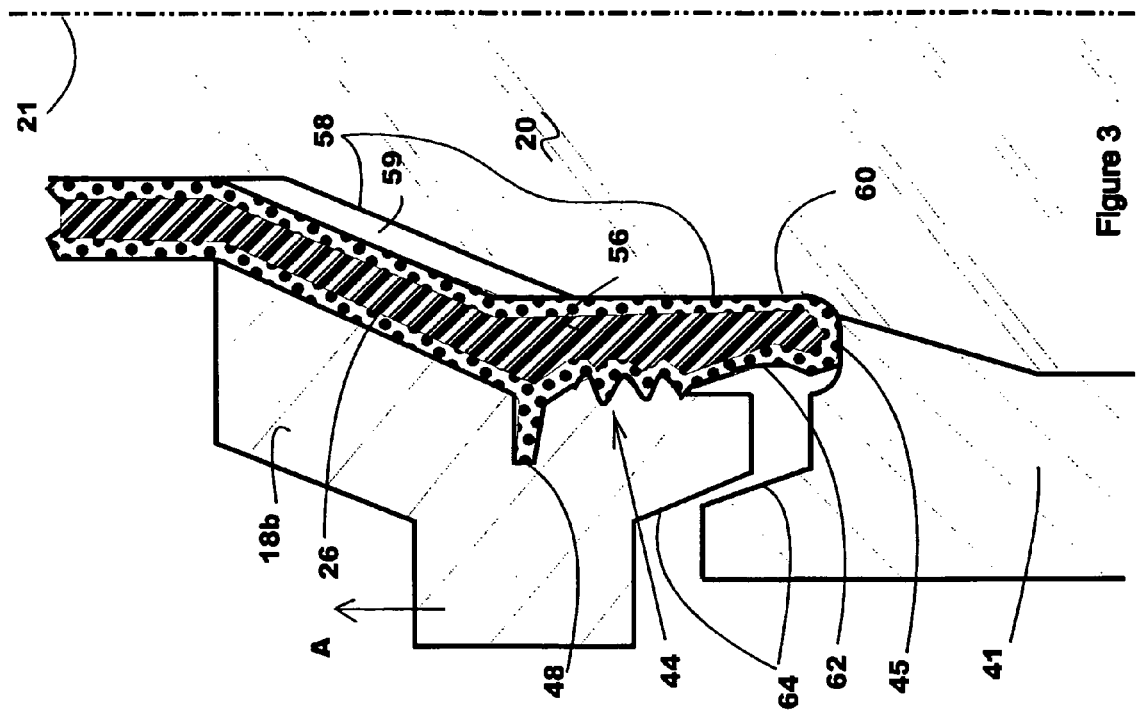
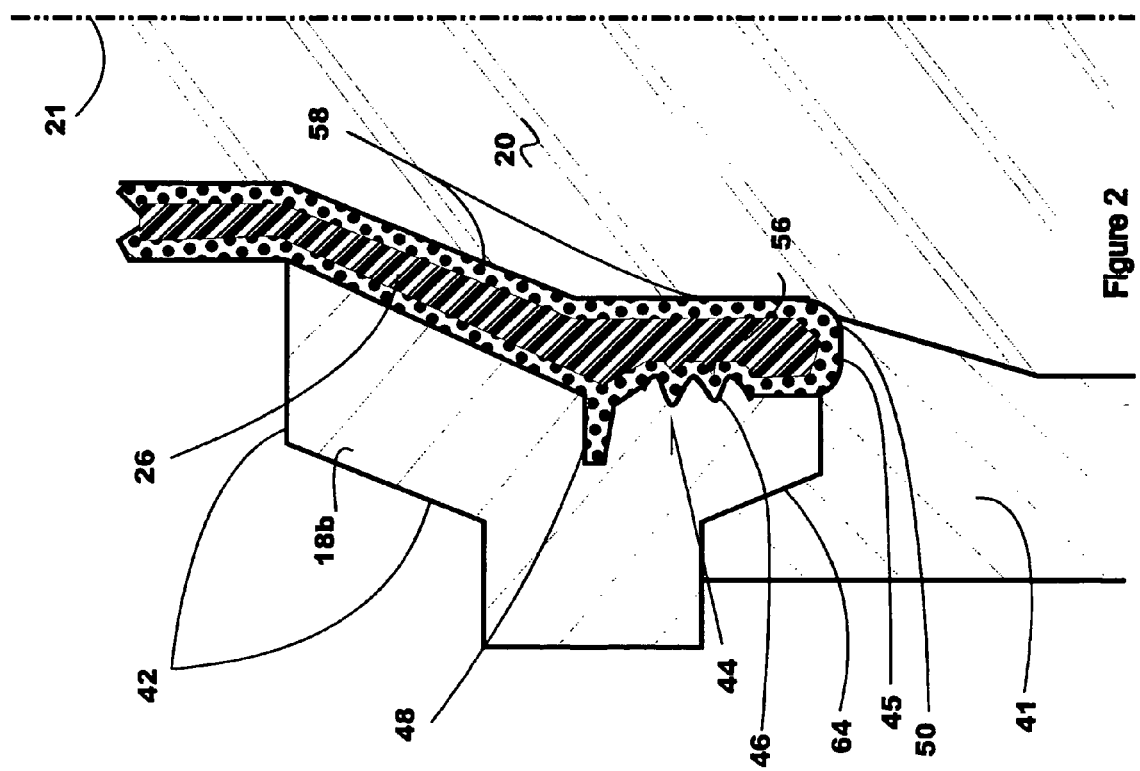

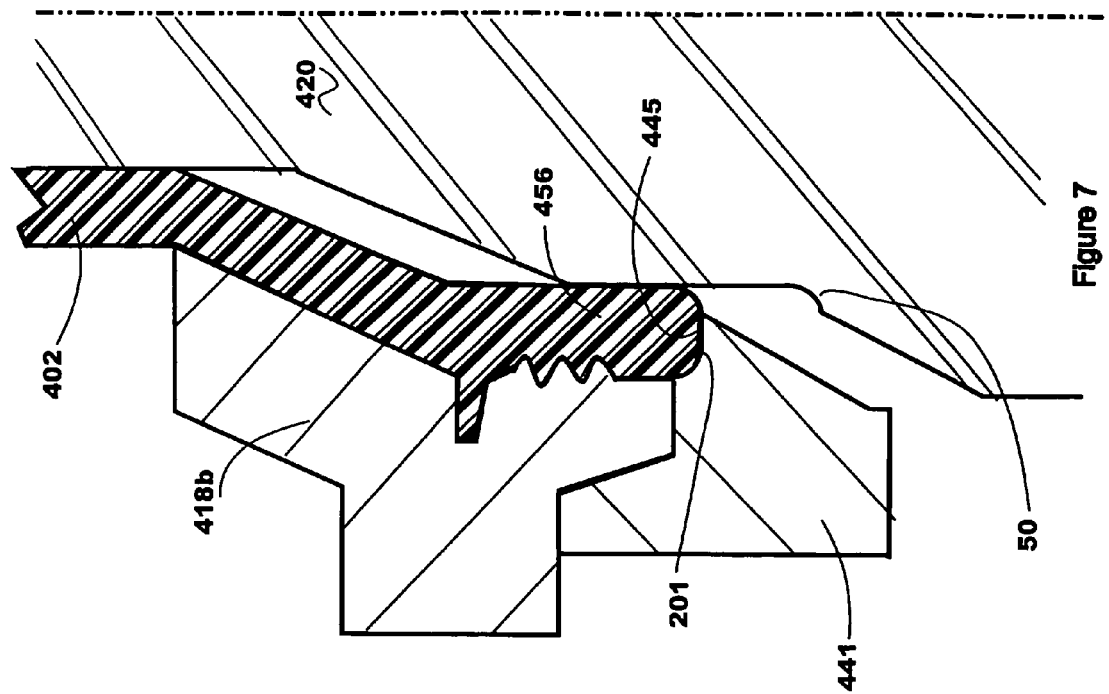
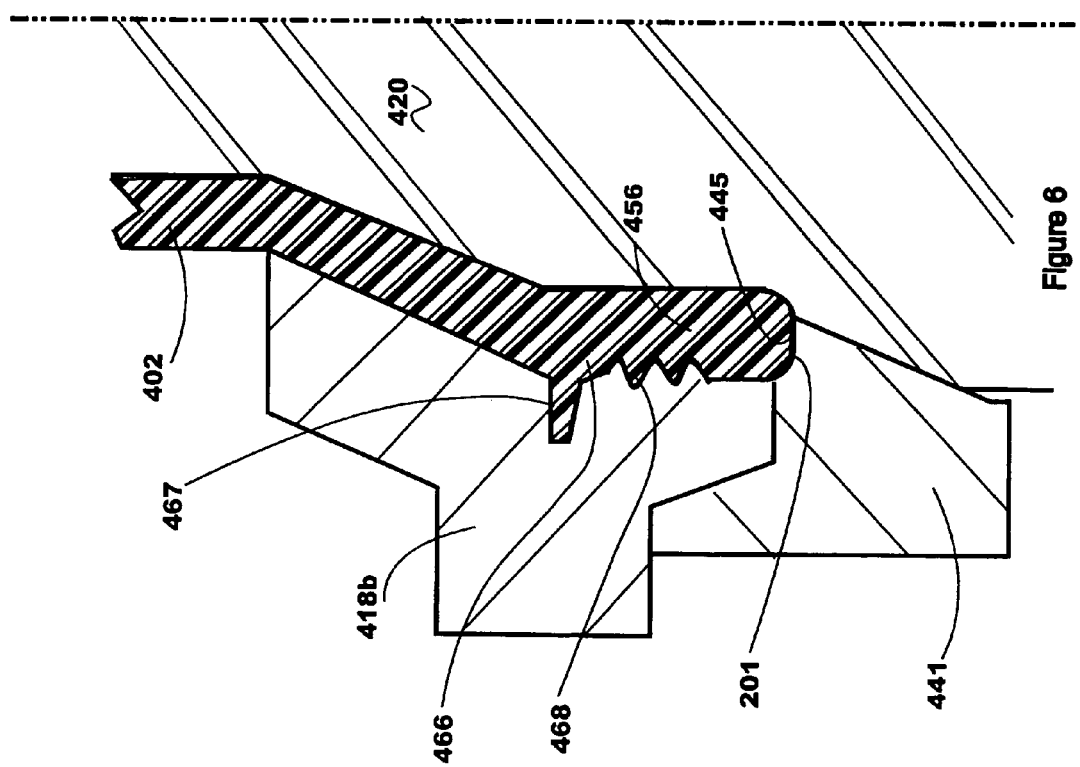

APPARATUS AND METHOD FOR TWO STAGE EJECTION OF A MOLDED PREFORM FROM A MOLD

BACKGROUND OF THE INVENTION

1. Field of the Invention

The present invention relates to methods and apparatus for injection molding preforms so that their subsequent reheating and blow-molding into containers is simplified. In particular, the present invention relates to a method and apparatus for providing an improved neck-ring or neck split components of an injection mold that allows for an earlier ejection or removal of the preform from the injection mold, thus reducing time needed to manufacture the preform. The method and apparatus are particularly well-suited for thermoplastic polyester polymer materials such as polyethylene terephthalate.

2. Related Art

Well known by those skilled in the art, the preform is a tube with a generally hollow circular cross-sectional configuration having a body portion, a closed end portion with a generally hemispherical configuration, and an open end. About the open end and superimposed between the open end and the body portion is a generally circular neck-finish. Ultimate container needs will dictate specific details of preform size and shape. Although smaller and larger sizes are feasible, technicians make specific preform configurations for specific container configurations with a capacity typically between 250 ml to four liters.

For receiving a closure (i.e., a lid), the neck-finish has a configuration generally having a sealing surface portion adjacent to the open end, a handling ring portion adjacent to the body portion that helps facilitate manufacture of the blow-molded container, and a threaded portion between the sealing surface and handling ring for attachment of the closure. To assure proper closure attachment and seal, the neck-finish requires sufficiently consistent and accurate dimensional characteristics generally free of distortions or deformations. While a screw thread is a common form, the threaded portion can be any form of lugs, snap-rings, or other appendages for attaching the closure, such as, but not limited to, a standard crown neck finish.

Also well known by those skilled in the art is the injection molding process. The process involves injecting a thermoplastic polymer or other plastic material at a molten elevated temperature through a small opening or nozzle into the injection mold. The injection mold is an assembly of various components creating a closed and sealed cavity that allows the molten polymer to form the preform without leakage between components. Once the injected polymer material sufficiently cools and solidifies, selected components of the injection mold separate to allow preform ejection or removal.

In a commonly used process for blow molding the container, an oven of a blow-molding machine heats and softens the polymer material of the body portion of the preform but not the neck-finish. The blow-molding machine, holding the preform by the handling ring portion of its neck-finish, places the heated preform into a blow-mold cavity where pressurized air then inflates and expands to conform the preform to the blow-mold cavity, thus forming the container. The neck-finish configuration of the blow-molded container generally remains unchanged and retains the configuration acquired when initially injection molded as the preform.

The time needed to injection-mold the preform is typically limited by the time needed to cool and solidify injected polymer material sufficiently to permit removal of the part from the mold without causing deformation or distortion. Usually, a segment of the preform having a thicker wall cross-sectional dimension determines the cooling time required. The plastic within the thicker wall cross-sectional segment generally requires more time to cool and solidify sufficiently and the neck-finish often has one of the thicker wall cross-sectional segments.

To form the open end and hollow circular cross-sectional configuration of the preform, the injection mold assembly typically uses a core component that is a substantially straight-sided rod with a longitudinal axis. Surrounding and adjacent to the core component is the neck-ring or the neck split components. The neck-ring is a pair of semicircular pieces that accurately shape the dimensional characteristics of the neck-finish and assists in removing the preform from the core component.

During preform removal, an apparatus within the injection mold causes the neck-ring components to initially move in unison in a direction parallel to the longitudinal axis of the core rod. The neck-ring components bearing against the threaded portion and handling ring portion of the neck-finish cause the preform to slide in a longitudinal direction from the core component.

Molten thermoplastic polymer material at its elevated temperature will generally shrink as it cools and solidifies. Accordingly, in manufacture, the preform will generally shrink against the core component as the material cools. As the core component restrains the shrinkage, molecular forces develop that cause the preform to grip the core's side. Forces acting on the threaded portion and handling ring (support ledge) portion of the neck-finish during removal must transmit through the wall of the preform to overcome frictional resistance created by the grip of the preform against the core. In other words, the forces applied to the threaded portion and the handling ring (support ledge) portion of the neck-finish are in shear with the resistance of the grip of the preform against the core.

The polymer material does not solidify at the same moment. Generally the material in direct contact with mold surfaces will solidify sooner than material not in direct contact. If the polymer material has not sufficiently solidified throughout the neck-finish wall cross-section, the neck-finish will not have sufficient strength to transmit the force and thus can deform and distort during removal, causing the sealing surface portion to become irregular and incapable of maintaining proper seal with the closure. Consequently, molding technicians extend cooling time to assure polymer solidification of the neck-finish, thus preventing distortion. For thermoplastic polyester polymer materials, the time typically needed to inject and cool the polymer and remove the preform is about 21 to 26 seconds.

Thus, in most preform designs, the portion limiting the earliest stripping time is the neck finish portion. FIG. 1 is a cross-sectional view of a preform mold assembly 10 having a core cooling channel 12, a core cooling tube 14, a neck-ring cooling channel 16, a neck-ring or neck split components 18a and 18b, a core component 20 having an axis 21, a mold cavity block 22 with a cavity surface 23, and a mold cooling channel 24 which extends circumferentially around the mold cavity block 22. FIG. 1 also shows a preform 26, a mold gate insert 28, and an injection nozzle 30. The preform mold assembly 10 is an assembly of various components that creates a closed and sealed cavity that allows molten polymer injected into the cavity to form the preform 26 without substantial leakage between components. In FIG. 1, the preform 26 has a configuration that is substantially identical to the closed cavity.

The core-cooling channel 12 includes a cooling inlet 32 and a cooling outlet 34. The neck-ring components 18a and 18b mount to the ejector bar 36a and 36b, and slide respectively on a wear pad 38 by a means of cams and gibs (not shown). The wear pad 38 fastens to a stripper plate 40. A core holder 41 retains the core component 20. The preform 26 has an open end 50, a closed end 52, a body portion 54, and a neck-finish 44. The neck-finish 44 has a sealing surface portion 45, a threaded portion 46, and a handling ring portion (support ledge) 48. The neck-ring components 18a and 18b comprise a pair of semicircular pieces that accurately shape the dimensional characteristics of the neck-finish 44 and assist in removing the preform 26 from the core component 20.

During the preform 26 removal or ejection, the preform mold assembly 10 initially separates along a parting line 42 allowing the core component 20, the core holder 41, the neck-ring components 18a and 18b, the preform 26, and other associated components to move in unison in a direction parallel to the axis 21 and thereby pull the preform 26 free from the mold cavity block 22, the mold gate insert 28, and the nozzle 30, thus separating the preform 26 from the cavity surface 23. Actuation of the stripper plate 40 then causes the ejector bar 36a, 36b and the neck-ring component 18a, 18b to initially move in unison in a direction parallel to the axis 21 to remove the preform 26 from the core component 20. Eventually, the neck-ring component 18a and the ejector bar 36a move in a first direction perpendicular to and away from the axis 21 on the wear pad 38 and simultaneously the neck-ring component 18b and the ejector bar 36b move in a second and opposite direction (of that taken by the neck-ring component 18a and the ejector bar 36a) perpendicular to and away from the axis 21 on the wear pad 38 setting the preform 26 entirely free from the preform mold assembly 10.

In addition to the distortion problem described above, another problem with known mold designs is where the neck ring halves do not seal against the core when they are closed (assembled), and the mold is then closed and clamped. After the mold has been opened and the part is ejected, the neck ring halves 18a and 18b that are carried forward by the stripper plate 40 are separated from each other. Before the next molding cycle can commence, the ejection mechanism must be reversed to restore the neck rings and stripper plate to their molding positions, shown in FIG. 1. This reversing procedure includes moving the neck rings towards each other until they touch during the backward stroke of the stripper plate so that, by the time the stripper plate has fully returned (in the position shown in FIG. 1), the neck rings are completely closed with their mutual parting surfaces touching. The complete closing of the neck rings can be performed at any point during the stroke of the return of the stripper plate as the neck rings are not in any danger of touching the core at any point.

In designs where the neck rings are going to touch the core in the mold closed position, it is preferable that they themselves are first closed so that when they finally touch the core they do so as an assembled pair. In the case of an earlier Husky design, the neck rings had a "shut-off" cylindrical surface that was parallel to the longitudinal axis of the core and touched the core diameter. However, this design is not optimal because if there is a gap between these two cylindrical surfaces greater than about 0.001 inch, the risk of plastic leaking through this gap during injection is significant. Consequently, this type of design requires close tolerance manufacture of these surfaces to ensure the assembled gap is minimized. Unfortunately, molds wear as they are used, and eventually a design like this leaks. Another early Husky design had a tapered, or conical, shut-off surface that contacted a correspondingly mating tapered surface on the core. These two surfaces were pressed together during molding, causing a positive seal that prevents plastic leakage. However, this design was not optimal because the preform still had neck-ring distortions when it was stripped from the core.

FIG. 2 is a partial cross-sectional view of selected components shown in FIG. 1 and further showing the preform 26 having a wall thickness 56, and the core component 20 having a core surface 58. The mold cavity block 22 (not illustrated in FIG. 2) has separated from the neck-ring 18b along the parting line 42.

FIG. 3 is a partial cross-sectional view similar to FIG. 2. The neck-ring 18b has initially moved in direction "A" parallel to the axis 21 to begin removal of the preform 26 from the core component 20. The neck-ring 18b (and 18a, not illustrated in FIG. 3) has separated from the core holder 41 along a sub-parting line 64. Furthermore, the preform 26 has partially separated 59 from the core surface 58. The sub-parting line 64 ends at the neck-finish 44 adjacent to and between the sealing surface portion 45 and the threaded portion 46 (see FIG. 2).

Molten thermoplastic polymer material at its elevated temperature will generally shrink as it cools and solidifies. Accordingly, in manufacture, the preform 26 will generally shrink against the core component 20 as the material cools. As the core component 20 restrains the shrinkage, molecular forces develop that cause the preform 26 to grip the core surface 58. Forces acting through neck-ring 18b (and 18a, not illustrated in FIG. 3) and ultimately bearing on the threaded portion 46 and the handling ring portion 48 of the neck-finish 44 during removal must transmit through the wall thickness 56 of the preform 26 to overcome friction created by the grip of the preform 26 against the core surface 58. If the polymer material has not sufficiently solidified throughout the neck-finish wall thickness 56, it will not have sufficient strength to allow transfer of forces to overcome friction of preform sticking around the core component 20 at about a point 60 of the core surface 58. This in turn will cause neck-finish distortion 62 as the neck-ring 18b (and 18a, not illustrated in FIG. 3) move in direction "A." The distortion 62 causes the sealing surface 45 to become irregular (not illustrated) thus a closure (not illustrated) subsequently attached to the neck-finish 44 will not properly seal.

To assure that the polymer within the wall thickness 56 is sufficiently solid and rigid to transmit forces applied by the neck-ring 18a and 18b, without neck-finish distortion occurring during removal, molding technicians may extend the time to manufacture the preform 26. Typical molding time needed for manufacturing the preform 26 of thermoplastic polyester materials is about 21 to 26 seconds. An attempt to alleviate this problem was made in another early Husky design wherein a small portion of the neck ring (less than fifty percent) was made to contact an outer circumferential portion of the top sealing surface of the preform. However, this design suffered from two disadvantages. First the small area of contact between the neck ring and the top sealing surface still required substantial cooling time to prevent neck ring distortions. Second, this design had the cylindrical neck ring mating surfaces which allowed for leakage of the molten plastic.

U.S. Pat. Nos. 4,521,177; 6,176,700; 6,220,850 and 6,413,075 show insert assembly arrangements for molding preforms. U.S. Pat. Nos. 4,025,022; 4,125,246; 4,179,254; 4,632,357; 4,648,834; and 5,137,442 show other injection molding machines utilizing various stripping devices. Also, U.S. patent application Ser. No. 10/350,325, filed Jan. 24, 2003, describes method and apparatus whereby a lifting structure lifts the preform by an edge of the open end thereof. Since the molded plastic article is lifted by its end, the article does not have to be solidified at its interior, thus allowing earlier removal of the article from the mold, reducing cycle time. However, even faster stripping times are desirable.

Therefore, there is a need for a neck finish portion cooling method and apparatus, which provides rapid, efficient neck cooling while further reducing the molding cycle time to further decrease the cost of producing molded plastic preforms.

SUMMARY OF THE INVENTION

An advantage of the present invention is the provision of methods and apparatus for quickly and efficiently removing molded plastic preforms from the molds, while minimizing deformation to the preforms.

According to a first aspect of the present invention, structure and/or steps are provided for a lock ring for use in an injection mold, including an inner sidewall surface having an area for sealing and aligning with a complementary surface on a mold core. An upper surface is provided having an area for sealing and aligning with a complementary surface on a neck ring, and having a lifting surface for lifting a lower portion of a molded article. The lock ring is configured to lift a preform from the mold core during a first lifting operation, and configured to separate from the neck ring during a second lifting operation.

According to a second aspect of the present invention, structure and/or steps are provided for an ejection apparatus, including a lock ring having an inner surface with an area for sealing and aligning with a complementary surface on a core. The lock ring also has an upper surface with an area for sealing and aligning with a complementary surface on a neck ring. The upper surface includes a lifting structure for lifting a portion of a molded article. Also included is a neck ring having a contoured inner surface, wherein said neck ring comprises at least two neck ring portions. The lock ring of the ejection apparatus is configured to lift a molded article from the core during a first lifting operation, and configured to separate from the neck ring during a second lifting operation by the neck ring.

According to a third aspect of the present invention, structure and/or steps are provided for a plastic preform injection molding machine in which a mold cavity is configured to receive a molten material and form it into a molded plastic preform, and a mold core is configured to engage an interior surface of the molded plastic preform. A first lifting structure has an inner surface with an area for sealing and aligning with a complementary surface on a core, and has an upper surface with an area for sealing and aligning with a complementary surface on a second lifting structure. The upper surface of the first lifting structure is configured to lift a molded plastic preform from the injection mold in a lifting direction for a first period of time, where the lower portion of the molded plastic preform lies in a plane substantially perpendicular to the lifting direction. A second lifting structure has an inner surface configured to lift an outer surface of the molded plastic preform from the injection mold in the lifting direction for a second period of time, where the outer surface of the molded plastic preform lies in a plane substantially parallel to the lifting direction.

According to a fourth aspect of the present invention, a structure and/or steps are provided for ejecting a preform from an injection mold, including an injection mold core having structure complementary to an inner surface of a lock ring, and a lock ring having an inner surface structure for sealing and aligning with the core. The lock ring has an upper surface structure complementary to a lower surface on a neck ring, and the upper surface structure includes a lifting structure for lifting a portion of a molded article. A neck ring has a lower surface structure for sealing and aligning with the lock ring, and having a contoured inner surface. The lock ring is configured to be translated with respect to the injection mold core during a first translation, and the neck ring is configured to be translated with respect to the lock ring during a second translation, in order to remove the molded article from the injection mold.

According to a fifth aspect of the present invention, structure and/or steps are provided for an injection mold assembly, wherein a cavity insert is provided in a cavity plate. An injection mold core including structure complementary to an inner surface of a lock ring is also provided. The lock ring has an inner surface structure for sealing and aligning with the core, as well as an upper surface structure complementary to a lower surface on a neck ring. The upper surface structure of the lock ring includes a lifting structure for lifting a portion of a molded article. Further provided is a neck ring with a lower surface structure for sealing and aligning with the lock ring, the neck ring being mounted on movable slides. The injection mold assembly also includes a core plate, an ejector plate, and a stripper plate that supports the movable slides.

According to a sixth aspect of the present invention, a method for ejecting a preform from an injection mold structure includes the steps of: (i) actuating at least one piston to separate an ejector plate and a stripper plate from a core plate, thereby separating an inner sidewall of a lock ring and an open end of a preform from a curved notch on the outer surface of a core, where the inner sidewall of the lock ring and the core are sealed and aligned during a molding operation; and (ii) actuating at least one connecting rod to separate the stripper plate from the ejector plate, thereby separating a neck ring and the preform from an upper surface of the lock ring, where a first portion of the upper surface of the lock ring is sealed and aligned with the neck ring during a molding operation, and wherein a second portion of the upper surface of the lock ring is a lifting surface for lifting the preform during the step of actuating the at least one piston.

According to a seventh aspect of the present invention, structure and/or steps for a control apparatus for ejecting a preform from an injection mold are provided, including at least one piston configured to move an ejector plate with respect to a core plate, causing an inner surface of a lock ring sealed and aligned with respect to a mold core to be displaced relative to said mold core, while a lifting surface on an upper surface of the lock ring engages a lower surface of the preform, causing the preform to be displaced relative to the mold core. Also included is at least one connecting rod configured to move a stripper plate with respect to the ejector plate, causing a lower surface of a neck ring sealed and aligned with respect to the lock ring to be displaced relative to the lock ring, while an inner surface of the neck ring engages a contoured surface of the preform, causing the preform to be further displaced relative to the mold core. The control apparatus also includes a control assembly for regulating the actuation of the at least one piston and the at least one connecting rod, so as to eject the preform from the injection mold.

According to an eighth aspect of the present invention, structure and/or steps are provided for an injection mold stack assembly including a cavity insert, and an injection mold core including structure complementary to an inner surface of a lock ring. A lock ring is also provided having an inner surface structure for sealing and aligning with the core, and having an upper surface structure complementary to a lower surface on a neck ring. The upper surface structure includes a lifting structure for lifting a portion of a molded article, and a neck ring having a lower surface structure for sealing and aligning with the lock ring.

BRIEF DESCRIPTION OF THE DRAWINGS

The advantageous structure and/or function according to the present invention will be more easily understood from the following detailed description of the preferred embodiments and the appended Drawings, as follows.

FIG. 2 is a partial cross-sectional schematic view of selected components of the assembly shown in FIG. 1, and the neck-finish portion of the preform before a neck-ring moves to complete preform ejection.

FIG. 3 is a partial cross-sectional schematic view of components shown in FIG. 2 with the preform partially removed and showing a typical neck-finish distortion.

FIG. 6 is a cross-sectional enlarged schematic view of a neck ring portion of the FIG. 4 embodiment.

FIG. 7 is a cross-sectional enlarged schematic view of a neck ring portion of the FIG. 4 embodiment, with the first stage of ejection completed.

DETAILED DESCRIPTION OF THE PRESENTLY PREFERRED EXEMPLARY EMBODIMENTS

1. Introduction

The present invention will now be described with respect to several embodiments in which a neck ring assembly uses a two stage (or step) stripping action to strip an injection-molded plastic preform from the core, before the preform is completely solidified, thus reducing cycle time. However, the present invention will find applicability in many molding technologies beyond injected-molded plastic preforms, such as the molding of containers, pails, trays, paint cans, tote boxes, and similar products, or other molded products possibly with non-circular cross-sectional shapes, etc.

In brief, the preferred embodiments of the present invention strip the preform from the core in a first lifting stage by the use of lifting surfaces which act on both the top sealing surface of the preform (the typically circular, open end of the preform where a sealing lid may be affixed, which surface is substantially orthogonal to the longitudinal axis of the preform) and a neck portion of the preform (comprising the threaded portion and the support ledge or handling ring). In a second lifting stage, the lifting surface which acts on the top sealing surface of the preform ceases lifting, and the lifting surface which acts on the neck handling portion completes the stripping action. By reconfiguring the neck-ring or neck half components to bear against the preform surfaces in two stages, the preform may be removed before polymer solidification throughout the preform is complete. Up to a two second reduction in preform manufacturing time can be achieved, without risk of neck-finish distortions.

2. The Structure

Figure 1:
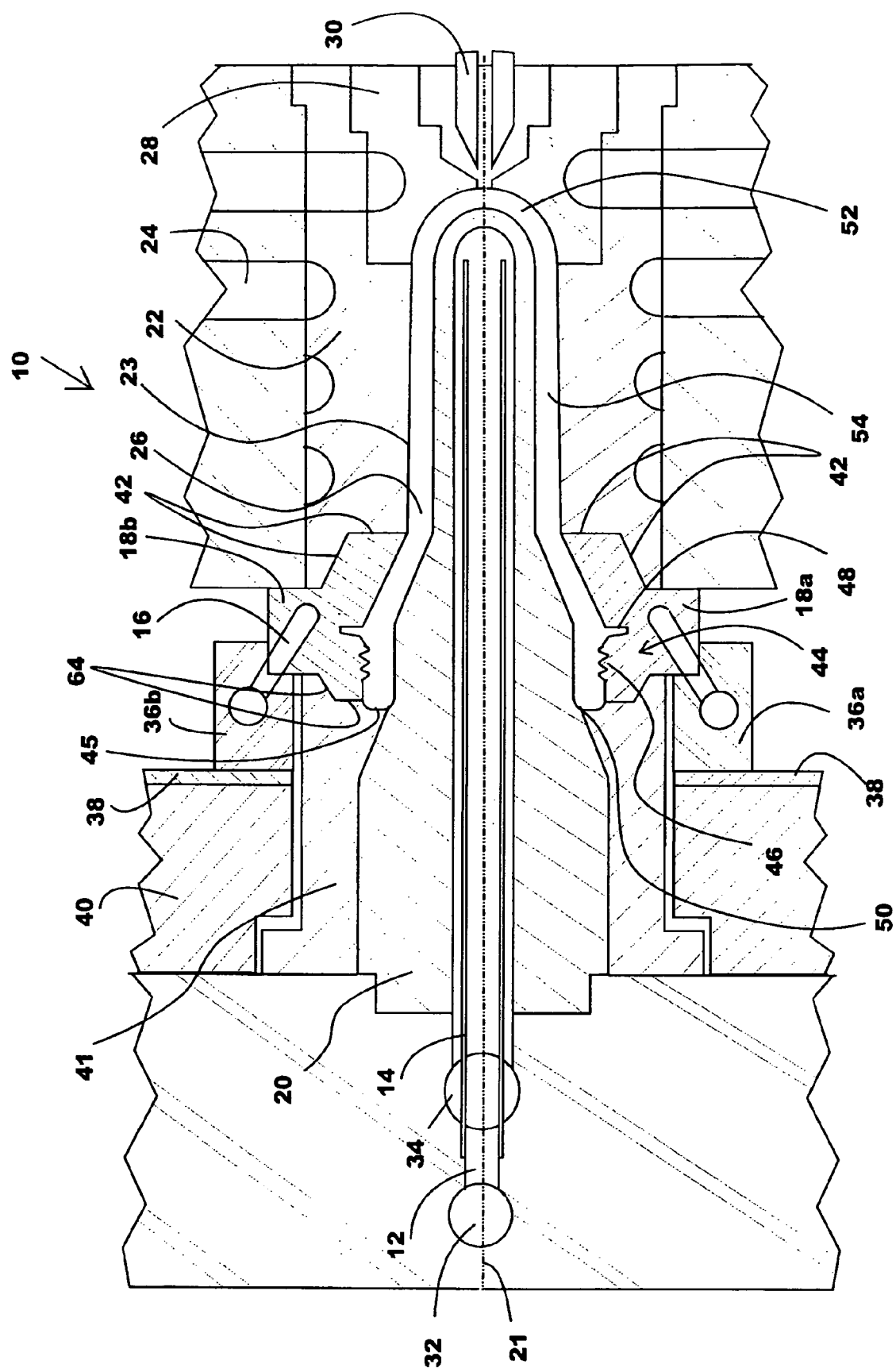
FIG. 1 is a cross-sectional view of a known preform injection mold assembly before ejection of a molded preform having a neck-finish and a sealing surface.
Figure 4:
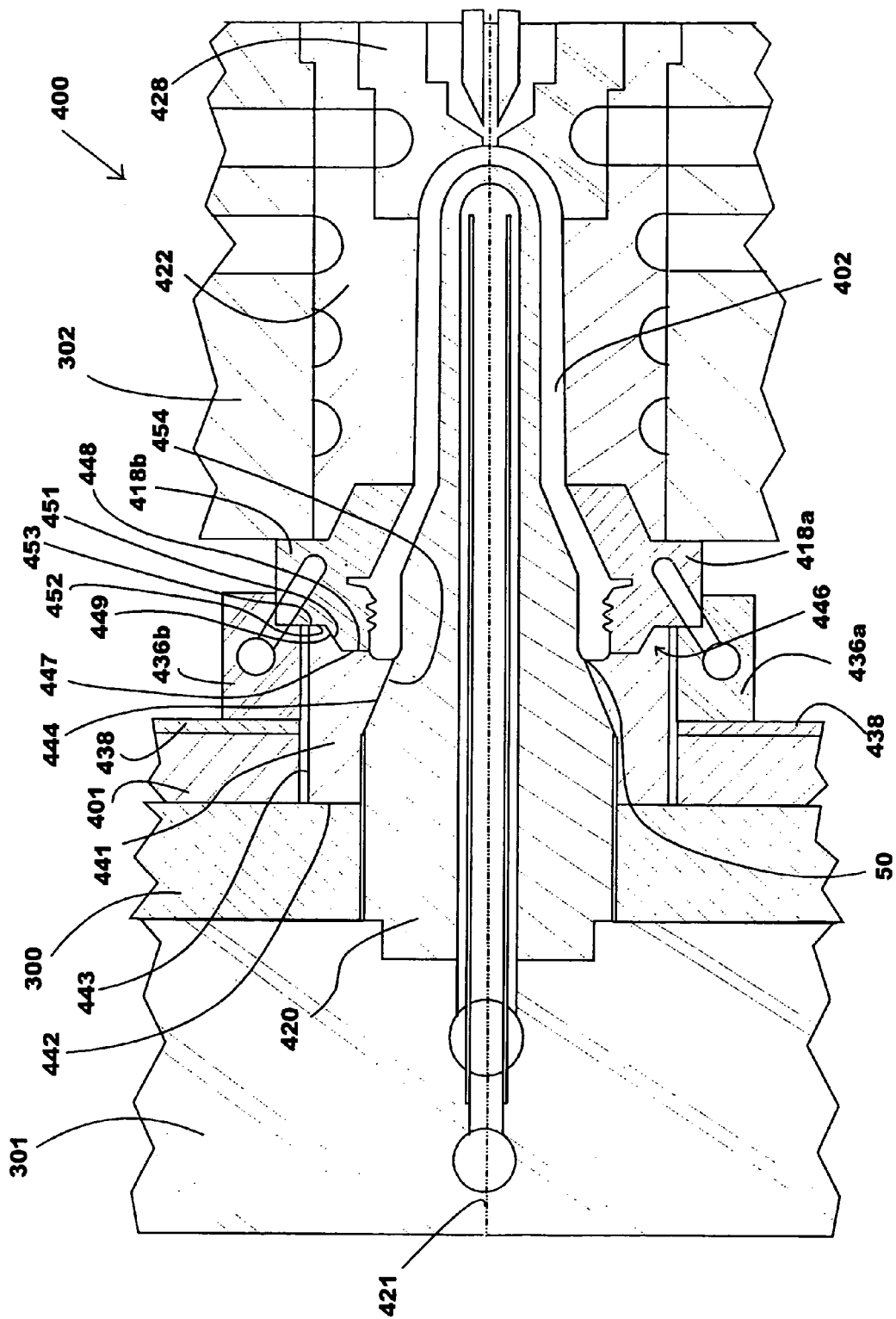
FIG. 4 is a cross-sectional schematic view of a stack assembly according to a preferred embodiment of the present invention, in the mold closed position.

FIG. 4 is a cross-sectional schematic view of a preform mold stack assembly 400 of a preferred embodiment of the invention, before ejection of the molded preform 402. The assembly 400 has neck half (or split) components 418a and 418b, and a core component 420 having the axis 421. The longitudinal axis 421 is substantially parallel to the ejecting direction of the preform 402. The stack assembly 400 also includes a cavity insert 422 containing a gate insert 428, and a lock ring 441. The lock ring 441 is mounted on its own ejector plate 300 that is positioned between a core plate 301 and a stripper plate 401. The cavity insert 422 is mounted in a cavity plate 302. The neck ring halves 418a and 418b are mounted on slides 436a and 436b, respectively. The slides 436a and 436b are guided at their ends by gibs (not shown) and carried on a wear plate 438 mounted to the stripper plate 401.

The lock ring 441 has a bottom surface 442 on one end for engaging a ejector plate 300. The lock ring includes an outer sidewall surface 443 and an inner sidewall surface. The inner sidewall surface includes a surface, preferably a taper 444, for engaging a complementary surface 454 on core 420 for aligning and sealing the lock ring with the core 420.

The lock ring 441 includes a second surface 446 on the upper surface of the lock ring that is located on an end opposite the bottom surface. The second surface 446 includes a lifting surface 445 for forming and engaging a portion of an article, for example a preform. The second surface 446 also includes a first seat 447 for engaging a complementary seat 448 on an end of the neck ring halves 436a and 436b to form a seal between them. The second surface 446 also includes a surface, preferably a taper 449, for engaging a complementary surface 451 on the neck ring halves 436a and 436b for aligning and sealing the lock ring with the neck rings. Finally, the second surface 446 also includes a second seat 452 for optionally engaging a complementary seat 453 on the neck ring in the event that additional surface area is required for transmitting clamping pressure through the stack 400.

In operation, when the mold is closed, the inner sidewall surface taper 444 engages a complementary taper 454 on core 420 aligning and sealing the lock ring 441 with the core 420. The second surface taper 449 of the lock ring 441 engages a complementary taper 451 on the neck rings 436a and 436b aligning and sealing the lock ring with the neck ring and the core. The lifting surface of the lock ring 445, the thread finish of the neck ring 468, and the core 420 form a portion of the cavity that will form the article during injection of a melt of material.

When the article is ejected from the core, the lock ring 441 is operated to move in a stripping direction. The lock ring 441 moves with the neck rings to a first stripping distance. Then the neck rings continue to move to a second stripping distance removing the article off and away from the core 420.

In an embodiment of the invention, a first drive may move the lock ring 441 the first stripping distance. The seat of the lock ring cooperates with the seat on the neck ring to also move the neck ring to the first stripping distance. Then a second drive moves the neck ring to the second stripping distance. Alternatively, the first drive moves the lock ring to the first stripping distance, and the second drive moves the neck rings to the first stripping distance followed by moving the neck rings to the second stripping distance.

FIG. 6 is an enlarged view of FIG. 4, showing how a lifting surface 445 of the lock ring 441 contacts more than 50% of the sealing surface 201 of the open (proximal) end of the preform 402. In FIG. 6, the lifting surface 445 contacts substantially 80% of the outer circumferential portion of the sealing surface 201, although this contact portion may range from 100% to 10%. This sealing surface 201 is one which typically seals against in inner surface of a lid (not shown), and may comprise an annular or circular shape disposed in a plane substantially orthogonal to the longitudinal axis 421 (or stripping direction). The neck portion 466 of the preform 402 may include a handling (or support) ledge 467, and a threaded portion 468. Of course, the preform portions are formed by corresponding structure on the molding surface of the neck ring halves 418a and 418b.

FIG. 6 shows two notable features according to the preferred embodiment. First, a lifting portion 201 contacts substantially fifty percent of the outer circumferential portion of the top sealing surface to lift the preform from the core after the outer skin is somewhat solidified (but not solidified in an interior portion of the preform), to reduce neck ring distortion. Second, core lock ring 441 has a tapered, conical surface disposed below and forming an acute angle with respect to the lifting portion 201, to tightly engage the outer surface of the core 420 and prevent leakage.

The lock ring molding surface 445 pushes directly on that part of the outer surface of the preform 402 closest to the core 420, where shrinkage may cause the preform to resist stripping. The stripping force exerted by the neck ring halves 418a and 418b and the lock ring 441 on the preform is a combination of a shear force and a compression force. The shear force is applied by the surfaces of the neck halves 418a, 418b which contact the outer surface portions of the preform 402 that are substantially parallel to the stripping direction. The compression force is applied by the surfaces of the neck halves 418a, 418b and the lock ring 441, which contact the outer surface portions of the preform 402 that are substantially perpendicular to the stripping direction. Notably, compression force is applied through the solidified skin portion of the preform sealing surface 201, and therefore can transmit its effect to cause stripping of the preform as soon as that skin portion is sufficiently solidified. This solidification occurs sooner in the molding cycle than the solidification of the inner core portion of the neck portion 466 by virtue of its direct touching of the respective cooled mold components. Consequently defect-free stripping of the preform can be commenced earlier in the molding cycle, typically savings of up to 2 seconds in cycle time have been achieved depending on preform mold design configuration.

The relative dimensions of the lifting portion 445 will depend upon the dimensions of particular preform being cooled, the preform molding temperature, the mold cooling apparatus, etc. Further, the lifting portion 445 may be a flat surface or a surface having grooves, pads, or other patterns therein configured to assist in cooling/lifting the preform. The lifting portion 445 may be made of the same metal as the neck ring, or a different metal designed to rapidly cool and securely lift the preform sealing surface 201.

Thus, the preform removal or ejection forces bear not only on the threaded portion 468 and the handling ring portion 467 of the neck portion 466, but also on the sealing surface 201 of the preform 402. The force now bearing against the sealing surface 201 places some of the polymer within the neck portion 466 in compression. Furthermore, being in direct contact with mold components, the material that will be in compression is more likely to have solidified first, thus it is better equipped to overcome the resistance created by the grip of the preform 402 against the mold surfaces.

By allowing forces to bear on the sealing surface, portion 201 lessens the need for removal forces to transmit entirely through the wall thickness of the preform where some of the polymer may not have completely solidified. Accordingly, the wall thickness of the preform no longer needs to be as rigid to overcome friction created by the grip of the preform against the core surface, thus allowing an earlier removal of preform from the mold assembly without risk of distortions or deformations.

FIG. 7 is an enlarged cross-sectional view of the preferred embodiment showing the first stage of preform stripping (or ejection) according to the present invention. In FIG. 7, the ejector plate 300 has moved the lock ring 441, and the stripper plate 401 has moved the neck halves 418a and 418b, relative to the core 420 by a first distance (typically 12 mm or 0.5 in.) over a first period of time (typically 0.5 seconds). The sealing surface 201 of the preform 402 is still in contact with the lifting surface 445 of the lock ring 441, although it has separated from the curved notch 450 on the outer surface of the core 420. At the end of this first stage, the interior portion of the preform 401 is often in the non solid state.

Figure 5:
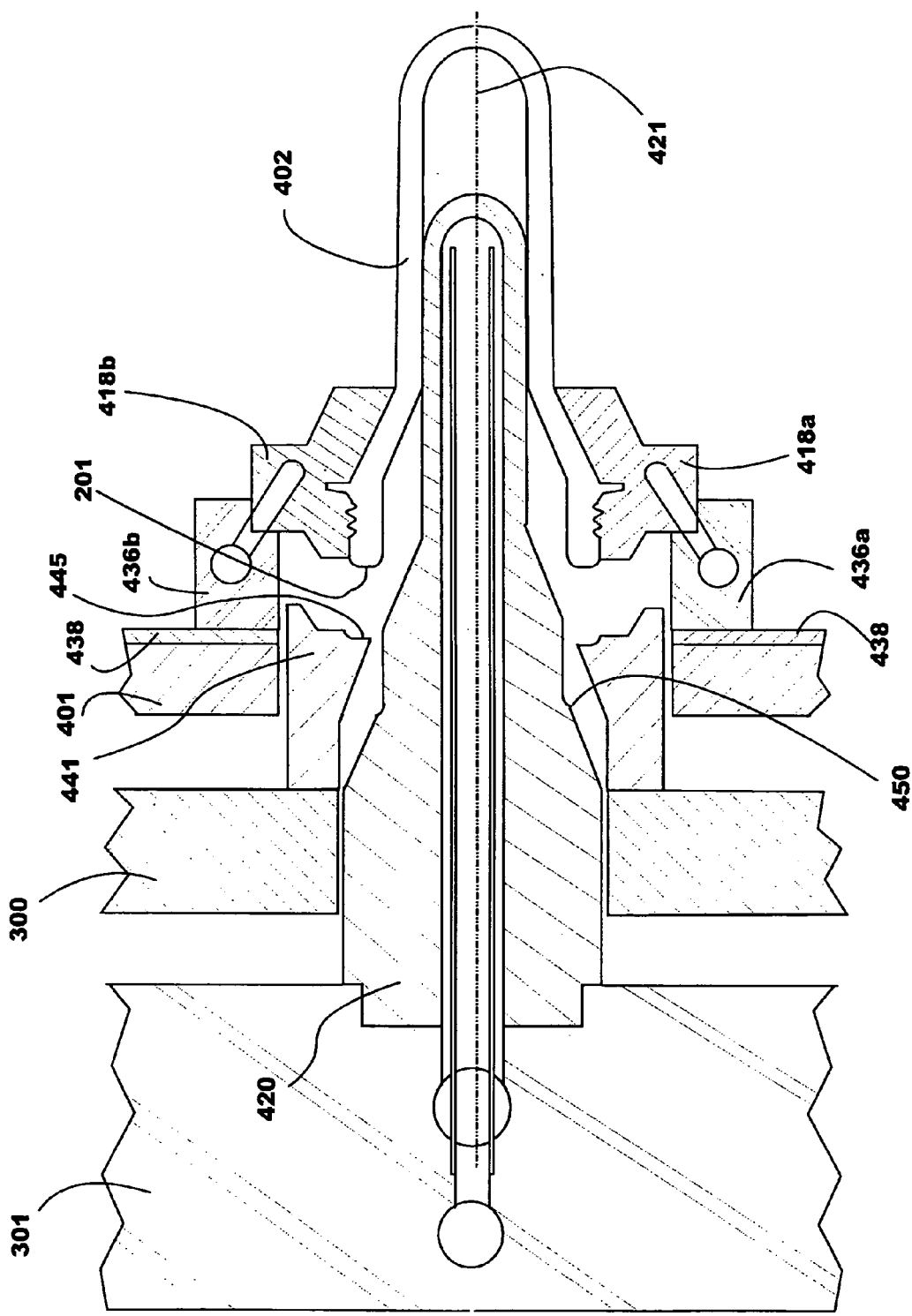
FIG. 5 is a cross-sectional schematic view of the assembly of the FIG. 4 embodiment, with the ejector in a partially forward position.
Figure 8:
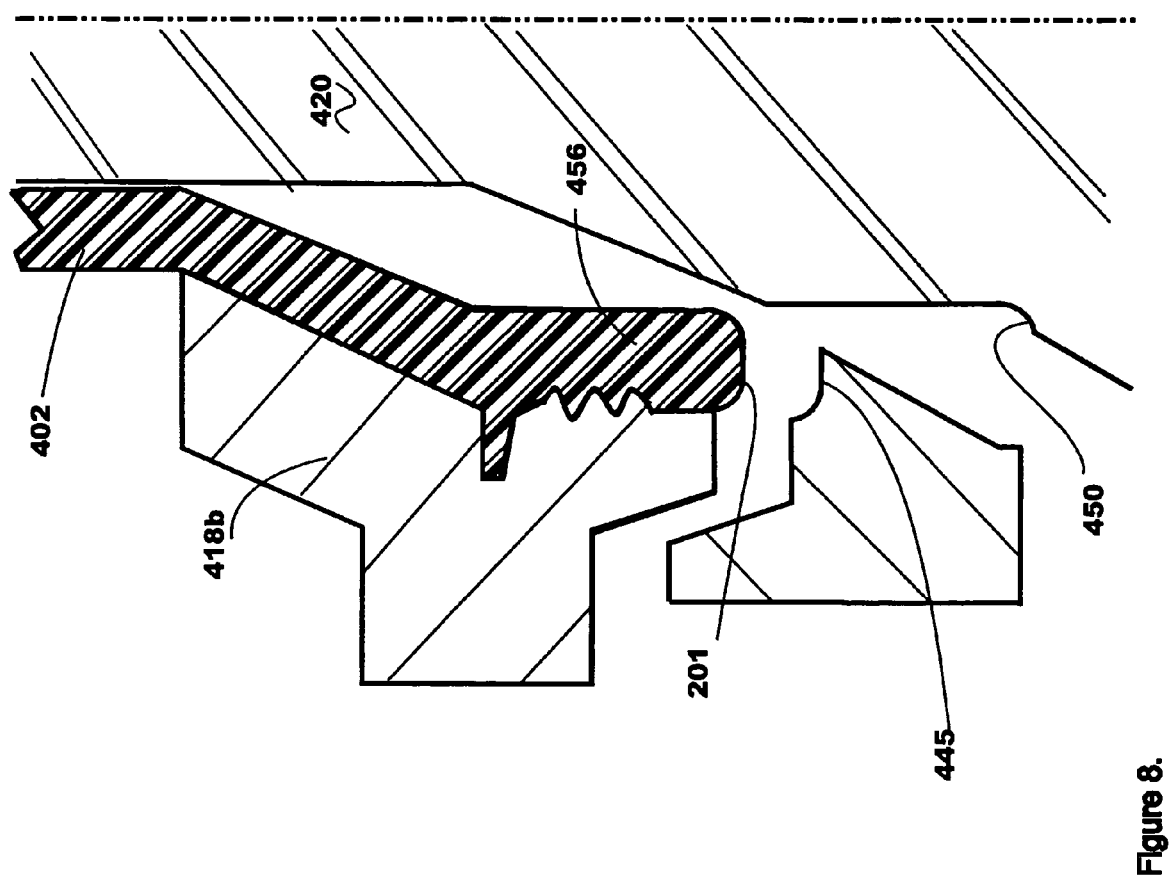
FIG. 8 is a cross-sectional enlarged schematic view of a neck ring portion of the FIG. 4 embodiment, with the second stage of ejection partly completed.

FIG. 8 is a cross-sectional schematic view of the preferred embodiment showing the second stage of preform stripping (or ejection) according to the present invention. In FIG. 8, the ejector plate 300 and the lock ring 441 have ceased movement in the stripping direction, but the stripper plate 401 has moved the ring halves 418a, 418b further in the stripping direction, typically by an additional 100 mm or 4 in. for an additional 1 second after the first stripping stage is completed. In this stage, the sealing surface 201 of the preform is exposed for air cooling while the preform 402 is carried further in the stripping direction. Also, the interior 456 of the preform 402 may still be in the nonsolid state. The respective portions of the core 420 and the lock ring 401 are also exposed for air cooling. While the preferred embodiment envisages equal movement (in distance and time) of the stripper plate and the ejector plate, these plates can move different distances and/or times in the first stage. Furthermore, three or more stages of movement (in distance and/or time) may be used, depending on the molding system and the molded article. FIG. 5 shows a point in the stripping process where the preform 402 is moved further in the ejection direction, partially removed from the core 420.

Figure 9:
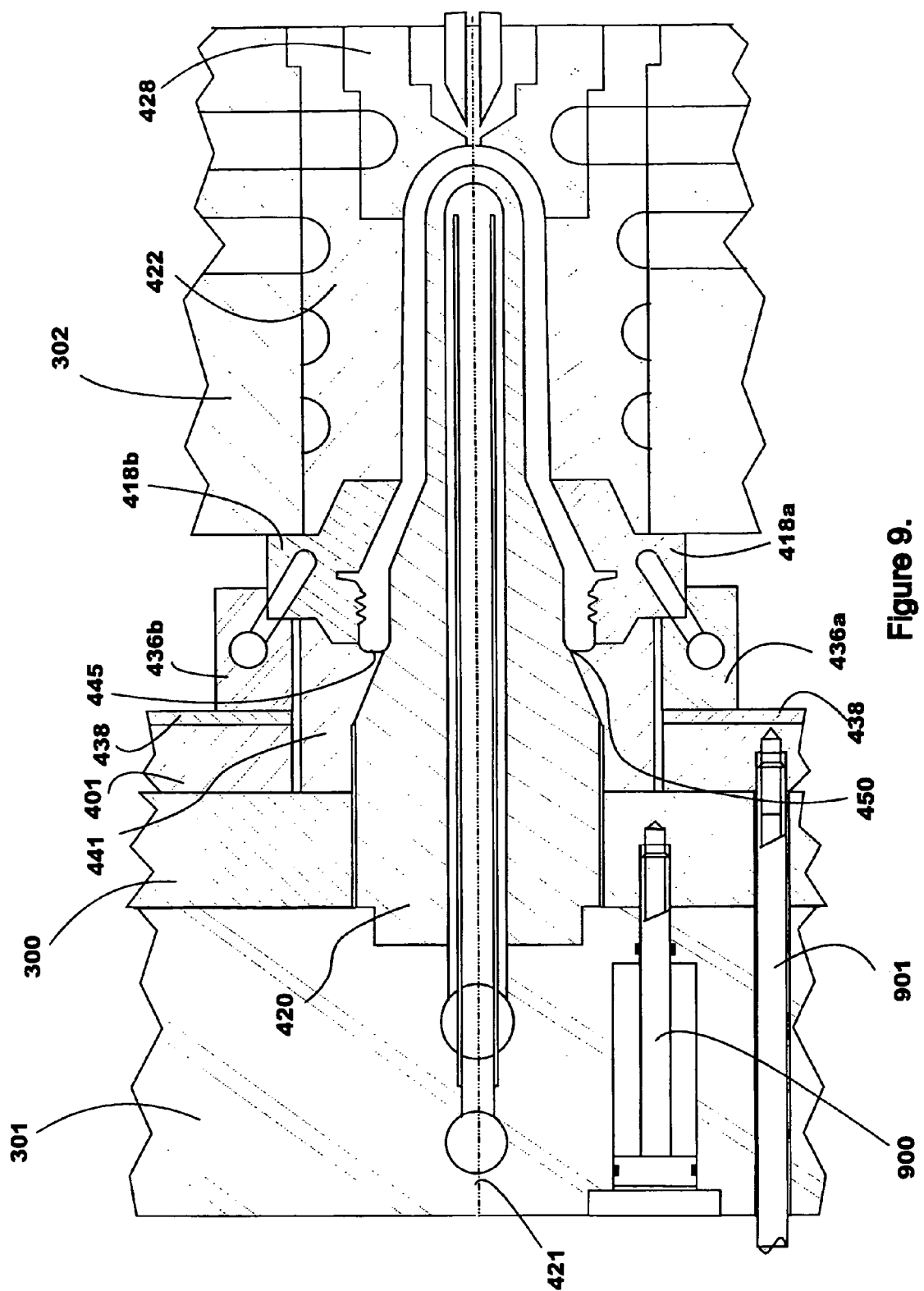
FIG. 9 is a cross-sectional schematic view of the FIG. 4 embodiment, shown in the mold closed position and with a preferred ejector actuation mechanism.
Figure 10:
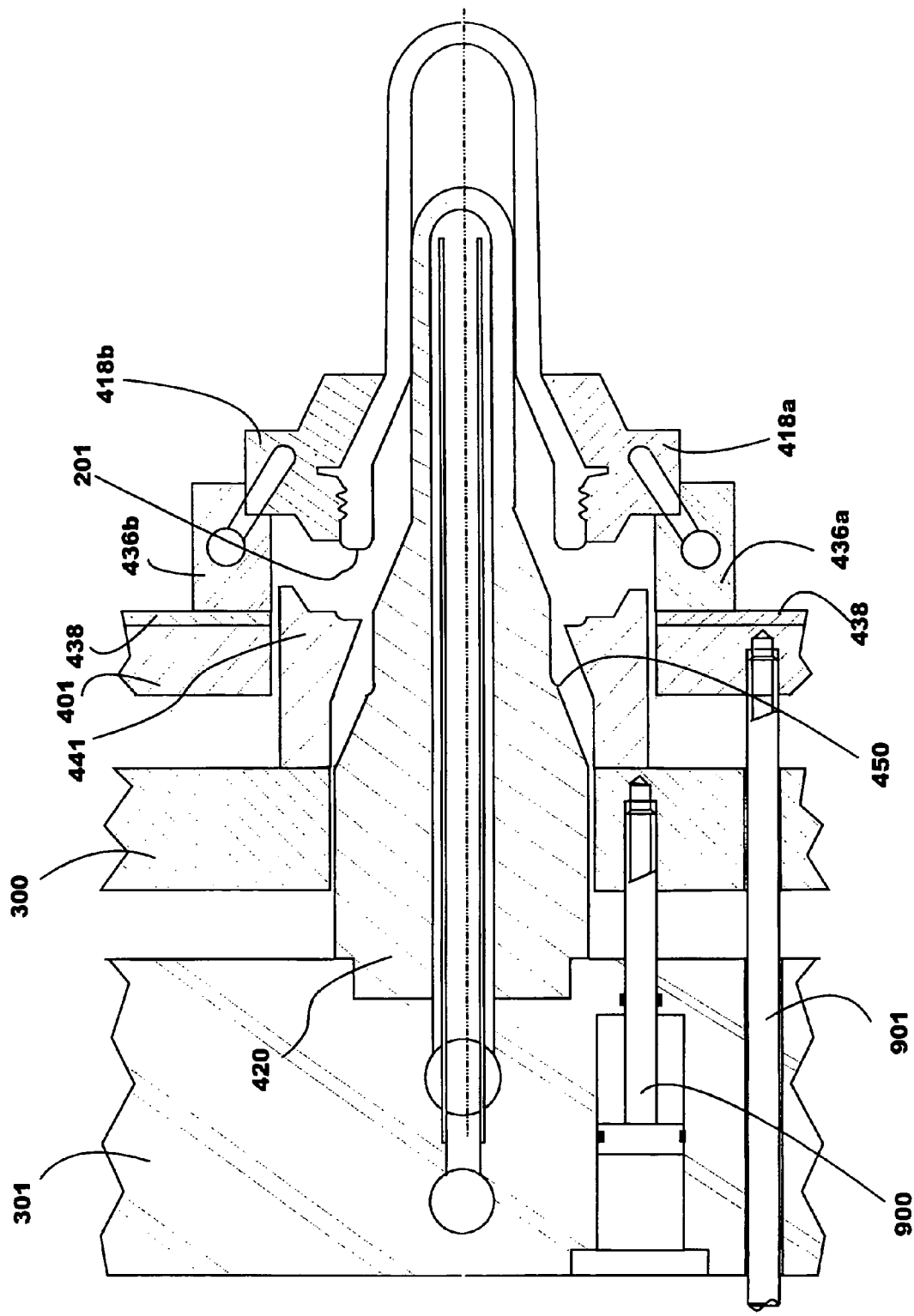
FIG. 10 is a cross-sectional schematic view of the FIG. 4 embodiment, shown in a partially ejector forward position with a preferred ejector actuation mechanism.

FIGS. 9 and 10 show a preferred ejector and stripper plate actuation mechanism, in the mold closed and mold open positions, respectively. The ejector plate 300 is moved forward and backward by piston 900, which is preferably housed in the core plate 301. The piston 900 is preferably driven via supply and return hydraulic lines, not shown. The stripper plate 401 is preferably moved forward and backward by a connecting rod 901 that connects the stripper plate 401 to the injection molding machine's ejector plate (not shown). FIG. 9 shows the mold in the closed position, and FIG. 10 shows the mold in a partially forward ejector and stripper plate position, indicating the two different stroke lengths of the ejector and stripper plates. Of course, the stripper plate and ejector plate actuation/driving mechanisms may be unified or separate, and may be any convenient source, such as electrical stepper motors, pneumatic cylinders or motors, and hydraulic cylinders or motors, etc.

The actuation mechanism includes a control assembly (not shown) that controls the actuators for the movement of the stripper plate 401 and the ejector plate 300 to occur at the appropriate time in the molding cycle. The control assembly may include a process logic controller (PLC) or computer based controller, a control program or logic sequence, interface components with the actuators, position sensors and communication components, and an operator interface device.

3. The Process

In operation, the molten plastic is injected into the mold, and the preform is formed between the core and the cavity wall. When it is time to strip the preform off the core 420, the ejection system of the machine is actuated to advance both the ejector plate 300 and the stripper plate 401 simultaneously (overlapping) for a predetermined forward stroke sufficient to move the preform away from that portion of the core 420 forming the inner corner of the top sealing surface of the preform, i.e., curved notch 450. The motion of the ejector plate 300 is stopped and the forward motion of the stripper plate 401 continues (or is started again), thereby separating the neck ring halves 418*a* and 418*b* from the lock ring 441, and thereby separating that portion of the preform's top sealing surface from the corresponding molding surface 445 on the lock ring 441. The stripper plate 401 continues forward the remaining portion of its stroke to eject the preform.

Once separated from the core, the preform may be moved to a post mold cooling station, or the preform may be ejected into a shipping container. Since the preform is stripped from the core by a force operating on the top sealing surface and then the outer side surface of the preform, the interior portion of the preform does not have to be completely solidified, allowing earlier stripping and a reduction in cycle times.

4. Conclusion

Thus, what has been described is a method and apparatus for efficiently ejecting molded plastic preforms from the core, achieving reduced cycle time and cost.

While the present invention shortens the manufacturing time of blow molded container preforms generally having circular cross-sectional shapes perpendicular to its axis, those skilled in the art will realize the invention is equally applicable to other molded products, possibly with non-circular cross-sectional shapes, such as, pails, paint cans, tote boxes, and other similar products requiring a similar general configuration and mold design characteristics as with the preform injection mold.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents discussed above are hereby incorporated by reference into the Detailed Description of the Preferred Embodiments.

What is claimed is:

1. A method of ejecting a preform from an injection mold, comprising the steps of:

actuating at least one piston to separate an ejector plate and a stripper plate from a core plate, thereby separating an inner sidewall of a lock ring and an open end of a preform from a curved notch on the outer surface of a core, where said inner sidewall of said lock ring and said core are sealed and aligned during a molding operation;

actuating at least one connecting rod to separate said stripper plate from said ejector plate, thereby separating a neck ring and the preform from an upper surface of said lock ring, wherein said neck ring maintains non-sliding contact with the preform throughout the separation of the neck ring from the lock ring, wherein a first portion of said upper surface of said lock ring is sealed and aligned with said neck ring during a molding operation, and wherein a second portion of said upper surface of said lock ring is a lifting surface for lifting the preform during the step of actuating said at least one piston; and moving at least a portion of the neck ring in a direction non parallel to the separation of stripper plate and the ejector plate.

2. A moveable lock ring apparatus for use in an injection mold, the lock ring apparatus comprising:

an inner sidewall surface including an area for sealing and aligning with a complementary surface on a mold core; and an upper surface including an area for sealing and aligning with a complementary surface on a neck ring, and having a lifting surface for lifting a lower portion of a molded article, said lock ring being configured for lifting a preform from the mold core during a first lifting operation, and configured to separate from the neck ring during a second lifting operation, said neck ring being configured so that at least a portion thereof (i) maintains non-sliding contact with the preform during the first lifting operation, and (ii) moves in a direction substantially transverse to the lifting direction a predetermined period of time greater than zero after said second lifting operation has begun.

3. The moveable lock ring apparatus of claim 2, wherein said lifting surface contacts substantially 50% of a sealing surface of said lower portion of the molded article.

4. A moveable lock ring apparatus for use in an injection mold, the lock ring apparatus comprising:

an inner sidewall surface including an area for sealing and aligning with a complementary surface on a mold core;

an upper surface including an area for sealing and aligning with a complementary surface on a neck ring, and having a lifting surface for lifting a lower portion of a molded article, said lock ring being configured for lifting a preform from the mold core during a first lifting operation, and configured to separate from the neck ring during a second lifting operation, said neck ring being configured so that at least a portion thereof moves in a direction substantially transverse to the lifting direction after said second lifting operation has begun;

a first lifting structure configured to move said lock ring and neck ring a first distance in a lifting direction; and a second lifting structure configured to allow said lock ring to remain stationary and to move said neck ring a second distance in the lifting direction from said lock ring.

5. The moveable lock ring apparatus of claim 2, wherein said first distance is different from said second distance.

6. An ejection apparatus for use in an injection mold, said ejection apparatus comprising:

a lock ring including an inner surface with an area for sealing and aligning with a complementary surface of a core, and an upper surface with an area for sealing and aligning with a complementary surface on a neck ring, said upper surface including a lifting structure for lifting a portion of a molded article; and a neck ring including a contoured inner surface, wherein said neck ring comprises at least two neck ring portions, said lock ring being configured for lifting a molded article from the core during a first lifting operation, and configured to separate from the neck ring during a second lifting operation by the neck ring, at least one of said neck ring portions being configured to (i) maintain non-sliding contact with the molded article during the first lifting operation, and (ii) be movable in a direction non-parallel to the lifting direction a predetermined distance greater than zero after the beginning of the second lifting operation.

7. The ejection apparatus of claim 6, wherein said contoured inner surface of said neck ring engages corresponding contoured features of the said molded article.

8. An ejection apparatus for use in an injection mold, said ejection apparatus comprising:

a first lifting structure including an inner surface with an area for sealing and aligning with a complementary surface on a core, and an upper surface with an area for sealing and aligning with a complementary surface on a second lifting structure, said upper surface of said first lifting structure being configured to lift a molded plastic preform from the injection mold in a lifting direction for a first period of time, the lower portion of the molded plastic preform lying in a plane substantially perpendicular to the lifting direction; and a second lifting structure including an inner surface configured to non-slidingly lift an outer surface of the molded plastic preform from the injection mold in the lifting direction for a second period of time, the outer surface of the molded plastic preform lying in a plane substantially parallel to the lifting direction, at least a portion of the second lifting structure being configured to move in a direction non-parallel to the lifting direction after the second lifting structure inner surface begins to lift the outer surface of the molded plastic preform.

9. The ejection apparatus according to claim 8, wherein said first lifting structure lifts the molded plastic preform relative to a mold core for the first period of time, which is less than the second period of time.

10. The ejection apparatus according to claim 9, wherein the molded plastic preform has a neck portion having a support ledge, threads, and a circular sealing surface, said circular sealing surface having a circular engagement portion lying in the plane substantially perpendicular to the lifting direction, and wherein said first lifting structure is configured to engage substantially greater than fifty percent of the circular engagement portion.

11. The ejection apparatus according to claim 10, wherein said second lifting structure has portions which respectively engage the molded plastic preform neck portion support ledge and the preform neck portion threads.

12. The ejection apparatus according to claim 8, further comprising first moving structure configured to move said first lifting structure a first distance in the lifting direction, and a second moving structure configured to move said second lifting structure a second distance in the lifting direction, the second distance being different than the first distance.

13. The ejection apparatus according to claim 8, wherein said second lifting structure applies a shear force to the molded plastic preform in the lifting direction, and wherein said first lifting structure applies a compressive force to the molded plastic preform in the lifting direction.

14. A preform ejecting apparatus provided in an injection mold, said preform ejecting apparatus comprising:

an injection mold core comprising structure complementary to an inner surface of a lock ring;

said lock ring including inner surface structure for sealing and aligning with said core, and including an upper surface structure complementary to a lower surface on a neck ring, said upper surface structure including a lifting structure for lifting a portion of a molded article; and said neck ring including lower surface structure for sealing and aligning with said lock ring, and including a contoured inner surface, said lock ring being configured to be translated with respect to the injection mold core during a first translation, and said neck ring being configured to be translated in first and second different directions with respect to the lock ring during a second translation, thereby removing the molded article from the injection mold, said neck ring being configured to be in non-sliding contact with the molded article during the second translation.

15. The preform ejecting apparatus of claim 14, wherein said neck ring comprises at least two neck ring portions.

16. The preform ejecting apparatus of claim 14, wherein said lock ring contacts a sealing surface of the molded article over at least 50% of said sealing surface.

17. An injection mold assembly comprising:

a cavity insert provided in a cavity plate;

an injection mold core including structure complementary to an inner surface of a lock ring;

a lock ring including an inner surface structure for sealing and aligning with said core, and including an upper surface structure complementary to a lower surface on a neck ring, said upper surface structure including a lifting structure for lifting a portion of a molded article; and a neck ring including a lower surface structure for sealing and aligning with said lock ring, said neck ring being mounted on movable slides;

a core plate;

an ejector plate;

a stripper plate that supports said movable slides;

a first actuating apparatus for equally displacing said ejector plate and said stripper plate with respect to said core plate, while said core plate remains stationary, said neck ring maintaining non-sliding contact with the molded article during the equal displacement; and a second actuating apparatus for displacing said stripper plate with respect to said ejector plate, and for moving at least a portion of said neck ring in a direction transverse to a lifting direction of said stripper plate a predetermined period of time greater than zero after said stripper plate has begun to displace with respect to said ejector plate.

18. The injection mold assembly of claim 17, wherein the displacement of said ejection plate and said stripper plate causes said lock ring and said neck ring to be equally displaced relative to said core, and wherein the displacement of the stripper plate with respect to the ejector plate causes said neck ring and said molded article to be displaced relative to said lock ring.

19. A control apparatus for ejecting a preform from an injection mold, comprising:

at least one piston configured to move an ejector plate with respect to a core plate, causing an inner surface of a lock ring sealed and aligned with respect to a mold core to be displaced relative to said mold core, while a lifting surface on an upper surface of the lock ring engages a lower surface of the preform, causing the preform to be displaced relative to said mold core;

at least one connecting rod configured to move a stripper plate with respect to said ejector plate, causing a lower surface of a neck ring sealed and aligned with respect to the lock ring to be displaced relative to said lock ring, while an inner surface of said neck ring non-slidingly engages a contoured surface of the preform, causing the preform to be further displaced relative to the mold core; and a control assembly for regulating the actuation of the at least one piston and the at least one connecting rod, and for causing at least a portion of the neck ring to move in a direction substantially parallel to the lifting surface, so as to eject the preform from the injection mold.

20. The control apparatus of claim 19, wherein said piston and connecting rod are provided as a unified structure.

21. The control apparatus of claim 19, wherein said piston and connecting rod are provided as separate structure.

22. The control apparatus of claim 19, wherein said piston and connecting rod are powered by a power source selected from the group consisting of electrical motors, pneumatic motors or cylinders, and hydraulic motors or cylinders.

23. An injection mold stack assembly comprising:

a cavity insert;

an injection mold core including structure complementary to an inner surface of a lock ring;

a lock ring having an inner surface structure for sealing and aligning with said core, and having an upper surface structure complementary to a lower surface on a neck ring, said upper surface structure including a lifting structure for lifting a portion of a molded article;

a neck ring having a lower surface structure for sealing and aligning with said lock ring; and movement structure configured to move (i) the lock ring and the neck ring together in a lifting direction while the neck ring maintains non-sliding contact with the molded article; (ii) the neck ring from the lock ring in the lifting direction, and (iii) two halves of the neck ring in a direction non-parallel to the lifting direction after the beginning of the movement of the neck ring from the lock ring.

* * * * *